(12) United States Patent
Steinmetz et al.

(10) Patent No.: US 10,822,521 B2
(45) Date of Patent: Nov. 3, 2020

(54) AQUEOUS BASE COATS HAVING AN IMPROVED RING LINE STABILITY

(71) Applicant: BASF Coatings GmbH, Münster (DE)

(72) Inventors: Bernhard Steinmetz, Muenster (DE); Norbert Loew, Wuerzburg (DE)

(73) Assignee: BASF COATINGS GMBH, Muenster (DE)

(*) Notice: Subject to any disclaimer, the term of this patent is extended or adjusted under 35 U.S.C. 154(b) by 66 days.

(21) Appl. No.: 16/335,312

(22) PCT Filed: Sep. 13, 2017

(86) PCT No.: PCT/EP2017/072950
§ 371 (c)(1),
(2) Date: Mar. 21, 2019

(87) PCT Pub. No.: WO2018/054726
PCT Pub. Date: Mar. 29, 2018

(65) Prior Publication Data
US 2020/0017712 A1 Jan. 16, 2020

(30) Foreign Application Priority Data
Sep. 22, 2016 (EP) .................................... 16190067

(51) Int. Cl.
| | | |
|---|---|---|
| C09D 175/16 | (2006.01) | |
| C09D 167/02 | (2006.01) | |
| C08K 5/05 | (2006.01) | |
| B05D 5/00 | (2006.01) | |
| B05D 7/16 | (2006.01) | |
| B05D 7/00 | (2006.01) | |

(52) U.S. Cl.
CPC ............. *C09D 175/16* (2013.01); *B05D 7/16* (2013.01); *B05D 7/534* (2013.01); *C09D 167/02* (2013.01)

(58) Field of Classification Search
CPC ........................... C09D 167/02; C09D 167/04
See application file for complete search history.

(56) References Cited

U.S. PATENT DOCUMENTS

2011/0111242 A1   5/2011  Tomizaki et al.
2015/0119497 A1*  4/2015  Matsui ................. C08F 112/08
                                                523/400

FOREIGN PATENT DOCUMENTS

| DE | 4009858 A1 | 10/1991 | |
|---|---|---|---|
| DE | 4437535 A1 | 4/1996 | |
| DE | 19930665 A1 | 1/2001 | |
| DE | 19948004 A1 | 7/2001 | |
| DE | 10043405 C1 | 6/2002 | |
| EP | 0649865 A1 | 4/1995 | |
| JP | H10259356 A | 9/1998 | |
| WO | 9115528 A1 | 10/1991 | |
| WO | 9215405 A1 | 9/1992 | |
| WO | 2014033135 A2 | 3/2014 | |
| WO | 2015007427 A1 | 1/2015 | |
| WO | WO-2015007427 A1 * | 1/2015 | ......... C08G 18/8141 |
| WO | 2016091539 A1 | 6/2016 | |

OTHER PUBLICATIONS

European Search Report for EP Patent Application No. 16190067.5, dated Mar. 16, 2017, 3 pages.
English translation of International Search Report for International Application No. PCT/EP2017/072950, dated Nov. 29, 2017, 2 pages.

* cited by examiner

*Primary Examiner* — Vu A Nguyen
(74) *Attorney, Agent, or Firm* — Armstrong Teasdale LLP

(57) ABSTRACT

An aqueous basecoat material with improved circulation line stability is disclosed. The aqueous basecoat material includes at least one hydroxyl-functional polymer as a binder component and at least one binder component which is different from the hydroxyl-functional polymer. The aqueous basecoat material also includes at least one carbonyl group-containing polyurethane poly(meth)acrylate and also at least one organic compound having at least two hydrazine, hydrazide and/or hydrazone groups. The aqueous basecoat material also includes at least one branched and/or secondary aliphatic monoalcohol having at least four carbon atoms.

15 Claims, No Drawings

AQUEOUS BASE COATS HAVING AN IMPROVED RING LINE STABILITY

CROSS-REFERENCE TO RELATED APPLICATIONS

This application is a U.S. National Phase Application of PCT/EP2017/072950, filed Sep. 13, 2017, which claims the benefit of priority to EP Application No. 16190067.5, filed Sep. 22, 2016, the contents of which are hereby expressly incorporated by reference in their entirety.

The present invention relates to innovative aqueous basecoat materials which possess excellent circulation line stability. The present invention also relates to a method for producing multicoat paint systems using the aqueous basecoat materials, and to the multicoat paint systems producible by means of said method. On account of their outstanding circulation line stability, the basecoat materials can be utilized optimally in the area of industrial coating, especially automotive finishing.

PRIOR ART

Known are a multiplicity of aqueous basecoat materials and also methods for producing multicoat color and/or effect paint systems (also called multicoat coatings or multilayer coatings) where such basecoat materials are used. Known from the prior art (compare, for example, German patent application DE 199 48 004 A1, page 17, line 37 to page 19, line 22, or German patent DE 100 43 405 C1, column 3, paragraph [0018] and column 8, paragraph [0052] to column 9, paragraph [0057] in conjunction with column 6, paragraph [0039] to column 8, paragraph [0050]), for example, is the following method, wherein (1) a pigmented aqueous basecoat material is applied to a substrate,
(2) a polymer film is formed from the coating material applied in stage (1),
(3) a clearcoat material is applied to the resulting basecoat film, and subsequently
(4) the basecoat film is cured together with the clearcoat film.

This method is used widely, for example, both for the original (OEM) finishing of automobiles and also for the painting of metal and plastic parts for installation in or on automobiles.

The present-day requirements concerning the technological and esthetic properties of such paint systems (coatings) are massive. Critically important here is not only that the coating compositions used have appropriately good properties in principle, but also that these properties are retained even after stresses on the coating material that occur inevitably in the industrial processing sector. For example, the coating materials must be stable on storage. Equally, however, they are required to withstand the mechanical stresses which they undergo as a result of the circulation line systems which are unavoidable in industrial painting plants. In such circulation line systems, the paints are repeatedly and in alternation brought to pressures of more than 10 bar, by using paint circulation pumps, and are passed through pipelines with lengths of up to several 100 meters, and then returned to reservoir vessels. The profile of rheological requirements, therefore, is extraordinarily high.

Particularly in the area of aqueous basecoat materials, which are a great challenge in terms of rheological stability because of the color pigments they contain and the water as principal solvent, a frequent problem is that of inadequate circulation line stability. This means that, as the paint is pumped repeatedly in circulation through a circulation line system, the rheological properties of the paint are adversely affected and hence the paint systems produced from them likewise have poorer performance properties, especially poorer esthetic properties.

Problem

The problem addressed by the present invention, then, was that of providing an aqueous basecoat material which exhibits excellent circulation line stability and consequently results in paint systems having very good properties even when processed in industrial systems which make use of such circulation line systems.

Solution

It has been possible to solve the stated problem by means of an aqueous basecoat material which comprises
(A) at least one hydroxyl-functional polymer as a binder component,
(B) at least one binder component which is different from component (A) and comprises
  (B1) at least one carbonyl group-containing polyurethane poly(meth)acrylate and also
  (B2) at least one organic compound having at least two hydrazine, hydrazide and/or hydrazone groups, and also
(C) at least one branched and/or secondary aliphatic monoalcohol having at least four carbon atoms.

The new basecoat material is also referred to below as basecoat material of the invention. Preferred embodiments of the basecoat material of the invention will become apparent from the description below and also from the dependent claims.

Likewise provided by the present invention is a method for producing a multicoat paint system on a substrate wherein a basecoat material of the invention is used and the basecoat material is passed via a circulation line system. The present invention additionally provides a multicoat paint system produced by said method.

The aqueous basecoat material possesses outstanding circulation line stability and as a result is outstandingly suitable for processing on industrial systems which make use of such circulation line systems. In spite of repeated pumping of the paint in circulation through a circulation line system, therefore, the resultant paint systems have an outstanding profile of properties, especially outstanding esthetic properties.

DESCRIPTION

The aqueous basecoat material of the invention comprises (A) at least one hydroxyl-functional polymer as binder component.

Binder or binder component for the purposes of the present invention refers in accordance with relevant DIN EN ISO 4618 to the nonvolatile fraction of a coating composition, without pigments and fillers. Examples of specific binders accordingly include typical coatings additives, or typical crosslinking agents, described later on below, although the expression is used below primarily in relation to particular physically and/or thermally curable polymers, examples being the polymers of component (A) or the constituents of component (B).

Suitable in principle as polymers for the binder component (A) are all polymers known in this context to the skilled person. Preference is given to using at least one polymer selected from the group consisting of polyurethanes, polyesters, poly(meth)acrylates and/or copolymers of the stated polymers such as polyurethane-poly(meth)acrylates (also called polyurethane-poly(meth)acrylate copolymers). The term "meth(acrylate)" makes it clear that in such a polymer there may be both acrylic and methacrylic monomers present. Irrespective of this, the skilled person is aware that such polymers may also include other olefinically unsaturated monomers such as, for example, typical vinylic monomers such as vinyl chloride and styrene. Such polymers and their preparation, and also corresponding starting materials, are known to the skilled person at any rate and require no further fundamental elucidation. Preferred polyurethanes are described for example in German patent application DE 199 48 004 A1, page 4, line 19 to page 11, line 29 (referred to therein as polyurethane prepolymer B1) or else in international application WO 92/15405, page 2, line 35 to page 10, line 32. Preferred polyesters are described for example in DE 4009858 A1 in column 6, line 53 to column 7, line 61 and column 10, line 24 to column 13, line 3 or else in WO 2014/033135 A2, page 2, line 24 to page 7, line 10. Preferred polyurethane-poly(meth)acrylate copolymers and their preparation are described for example in WO 91/15528 A1, page 3, line 21 to page 20, line 33, in DE 4437535 A1, page 2, line 27 to page 6, line 22 or else in WO 2015/007427 A1, page 3, line 29 to page 16, line 17.

The stated polymers as binders are hydroxyl-functional. Preferably they have a hydroxyl number of 5 to 200 mg KOH/g, more preferably 15 to 150 mg KOH/g.

The hydroxyl number for the purposes of the present invention is determined according to DIN 53240 and is based in each case on the polymer itself, in other words on the solids content (for solids content measurement method, see later on below).

The stated polymers (A) as binders are used preferably in the form of aqueous dispersions, more particularly secondary dispersions, in the basecoat material. In order to be able to be dispersed effectively in aqueous dispersion, the polymers are preferably hydrophilically modified ionically and/or nonionically in a known way. With particular preference they are anionically modified, and are therefore preferably carboxy-functional.

Based on the solids content, the polymers preferably possess an acid number of 0 to 50 mg KOH/g, more particularly 2 to 45 mg KOH/g (measured according to DIN 53402).

With particular preference, for the purposes of the present invention, the binder component (A) comprises a combination of at least one hydroxyl-functional polyurethane-poly(meth)acrylate copolymer and at least one hydroxyl-functional polyester. With further preference it also comprises at least one hydroxyl-functional polyurethane.

The sum total of the weight percentage fractions, based on the film-forming solids content of the pigmented aqueous basecoat material, of all hydroxyl-functional polymers (A) as binder component is preferably 2 to 95 wt %, more preferably 5 to 95 wt %, and very preferably 10 to 90 wt %.

By film-forming solids content, corresponding ultimately to the binder fraction, is meant the nonvolatile weight fraction of the basecoat material, without pigments and, where appropriate, fillers. The film-forming solids content can be determined as follows: A sample of the pigmented aqueous basecoat material (approximately 1 g) is admixed with 50 to 100 times the amount of tetrahydrofuran and then stirred for around 10 minutes. The insoluble pigments and any fillers are then removed by filtration and the residue is rinsed with a little THF, the THF being removed from the resulting filtrate on a rotary evaporator. The residue of the filtrate is dried for two hours at 120° C. and the resulting film-forming solids content is obtained by weighing.

In the case of a possible particularization to basecoat materials comprising preferred polymers (A) in a specific proportional range, the following applies: The polymers (A) which do not fall within the preferred group may of course still be present in the basecoat material. In that case the specific proportional range applies only to the preferred group of polymers (A). It is nevertheless preferred for the specific proportional range to apply likewise to the total fraction of polymers, consisting of polymers (A) from the preferred group and polymers (A) which do not fall within the preferred group.

In the case, therefore, of restriction to a proportional range of 2 to 95 wt % and to a preferred group of polymers (A), this proportional range evidently applies first of all only to the preferred group of polymers (A). It is then preferred, however, for there overall to be likewise from 2 to 95 wt % of all originally encompassed polymers (A), consisting of polymers (A) from the preferred group and polymers (A) which do not fall within the preferred group. If, therefore, 80% by weight of polymers (A) of the preferred group is used, then at most 15 wt % of the polymers (A) of the non-preferred group may be used.

For the purposes of the present invention, the stated principle is valid for all stated components of the basecoat material and their proportional ranges, examples being the components (B) and (C) described later on below.

The aqueous basecoat material further comprises a specific binder component (B), which is different from the component (A).

The binder component (B) comprises first of all (B1) at least one carbonyl group-containing polyurethane-poly(meth)acrylate.

Such polymers and their preparation are again known to the skilled person. It is important in this context that the polyurethane-poly(meth)acrylate contains carbonyl groups. Carbonyl groups for the purposes of the present invention are keto groups and aldehyde groups, preferably keto groups. Through these carbonyl groups and through the presence of components (B2) as described later on below, the crosslinking reaction with formation of imines is possible. The binder component (B) is therefore self-crosslinking.

As noted, corresponding reaction regimes for the preparation of polyurethane-poly(meth)acrylates are known. In order to introduce carbonyl groups into such polymers, correspondingly functionalized monomers are incorporated by copolymerization into the polymer framework. This is preferably done by using monomers containing vinyl groups which additionally contain carbonyl groups. Use may be made, for example, of monomers such as methyl vinyl ketone, (meth)acrolein, crotonaldehyde or diacetone(meth)acrylamide. Diacetone-acrylamide is preferred. The fraction of monomers containing carbonyl groups for use in the preparation is for example 5 to 70 wt %, based on the total weight of the starting materials used in preparing the polymer in question.

The stated polymers (B1) are preferably prepared in the form of aqueous dispersions and then admixed with component (B2). In order to be able to be dispersed effectively in aqueous dispersion, the polymers (B1) are preferably modified hydrophilically, ionically and/or nonionically, in a known way. With more particular preference they are anionically modified, and are therefore preferably carboxy-functional.

Component (B2) is an organic compound containing at least two hydrazine, hydrazide and/or hydrazone groups. Preferred compounds are those of low molecular weight, having a molecular weight of less than 1000 g/mol. Such compounds are likewise known. Examples include bishydrazides of dicarboxylic acids having 2 to 12 C atoms such as the bishydrazides of oxalic acid, malonic acid, succinic acid, glutaric acid, adipic acid, pimelic acid, suberic acid, azelaic acid, sebacic acid or the isomeric phthalic acids; carbonic bishydrazide, alkylene- or cycloalkylene-bis-semicarbazides, N,N'-diaminoguanidine, alkylenebishydrazines such as N,N'-diaminopiperazine, arylenebishydrazines such as phenylene- or naphthylenebishydrazine, alkylenebis-semicarbazides, bishydrazides of dialdehydes and diketones. Examples of components (B2) with higher functionality are the hydrazides of nitrilotriacetic acid or of ethylenediaminetetraacetic acid.

Preference is given to using bishydrazides of dicarboxylic acids having 2 to 12 C atoms, more particularly the bishydrazide of adipic acid.

As already described above, component (B) is used preferably in the form of an aqueous dispersion in the basecoat material. It is preferred here for the stoichiometric ratio of carbonyl groups in component (B1) to the hydrazine, hydrazide and/or hydrazone groups in component (B2) to be from 40:1 to 1:2, more preferably from 20:1 to 1:2.

Binder components (B) of this kind are described for example in EP 0 649 865 A1, page 3, line 1 to page 9, line 46 and also in associated examples 2, 4, 6, and 7 to 9. Such components are available commercially in the form of aqueous dispersions under the trade name Daotan (from Allnex).

The sum of the weight percentage fractions, based on the film-forming solids content of the pigmented aqueous basecoat material, of all binder components (B) is preferably 2 to 95 wt %, more preferably 5 to 95 wt %, and very preferably 10 to 90 wt %.

The aqueous basecoat material further comprises at least one specific alcohol (C) as solvent. This is a branched and/or secondary aliphatic monoalcohol having at least four carbon atoms.

Aliphatic compounds, in agreement with the usual definition, are all organic compounds which are not aromatic or contain aromatic groups. Accordingly, an aliphatic monoalcohol may be a molecule which, apart from the hydroxyl group, consists exclusively of carbon and hydrogen. It is equally possible, however, for there to be further heteroatoms present as well as the oxygen atom of the hydroxyl group, more particularly in the form of bridging groups such as ether, ester, amide and/or urethane groups, especially ether groups.

For preference the alcohol (C), apart from the one hydroxyl group, contains no other terminal functional groups which contain heteroatoms.

The alcohols (C) are secondary, branched, or both secondary and branched.

An aliphatic secondary alcohol is one in which the hydroxyl group is linked to a carbon atom to which only one hydrogen atom is linked. Two of the radicals on this first carbon atom, then, are aliphatic radicals, which are each linked via a carbon atom to the first carbon atom.

If the alcohol is secondary, the aliphatic radical of the monoalcohol may be linear, branched or cyclic.

Linear in this context, as is known, means that the radical in question has no instances of branching in respect of the main carbon chain, the carbon atoms instead being arranged exclusively in linear sequence in a chain. It is possible, however, for the main carbon chain to contain bridging groups such as ether groups, thus meaning that the direct sequence of carbon atoms is interrupted.

Branched or nonlinear therefore means for the purposes of the present invention that the radical under consideration, unlike linear radicals, has branching in the main carbon chain—in other words, in contrast to the situation with the linear radicals, at least one carbon atom of the radical in question is a tertiary or quaternary carbon atom. Interruption in the direct sequence of carbon atoms in the main chain, as stated above, is of course still possible.

Radicals termed cyclic or cycloaliphatic are those in which at least some of the carbon atoms present are linked in such a way as to form one or more rings. Besides the one or more rings, of course, there may be other, acyclic linear or branched aliphatic groups present in a cycloaliphatic radical.

If the alcohol is branched, it may contain a primary, secondary or tertiary hydroxyl group, preferably a primary or secondary hydroxyl group.

The alcohol (C) has preferably at least 6, more preferably at least 7, carbon atoms. Preferred ranges are 6 to 12, more preferably 7 or 8, carbon atoms.

Examples include 3-butoxy-2-propanol, 1-propoxy-2-propanol, dipropylene glycol monomethyl ether, 2-ethylhexanol, and 2-ethylhexyl glycol. Preferred are 3-butoxy-2-propanol, dipropylene glycol monomethyl ether, and 2-ethylhexanol, and further preferred are 3-butoxy-2-propanol and 2-ethylhexanol, especially 3-butoxy-2-propanol.

The sum of the weight percentage fractions, based on the total weight of the pigmented aqueous basecoat material, of all monoalcohols (C) is preferably 1 to 10 wt %, more preferably 2 to 10 wt %, and very preferably 3 to 10 wt %.

The basecoat material of the invention comprises color and/or effect pigments. Such color pigments and effect pigments are known to the skilled person and are described for example in Rompp-Lexikon Lacke and Druckfarben, Georg Thieme Verlag, Stuttgart, N.Y., 1998, pages 176 and 451. The fraction of the pigments may be situated for example in the range from 1 to 40 wt %, preferably 2 to 30 wt %, more preferably 3 to 25 wt %, based on the total weight of the pigmented aqueous basecoat material.

The basecoat material may also comprise typical crosslinking agents that are known per se, especially aminoplast resins and/or blocked and/or nonblocked polyisocyanates, especially preferably melamine resins. With preference it does include such a crosslinking agent. The sum of the weight percentage fractions, based on the film-forming solids content of the pigmented aqueous basecoat material, of all crosslinking agents is preferably 1 to 40 wt %, more preferably 5 to 35 wt %, and very preferably 7.5 to 30 wt % or even 10 to 30 wt %.

It follows from the above that the basecoat material at any rate is thermally curable, in other words comprises thermally curable components. This applies at any rate to the self-crosslinking component (B). This equally applies to the hydroxyl-functional component (A) in the presence of possible crosslinking agents such as melamine resins.

In line with the common definition, indeed, the term "thermal curing" denotes the heat-initiated chemical crosslinking of a coating film for which, in the parent coating material, a binder and a separately present crosslinking agent, and/or self-crosslinking binders, are employed. Particular reactive functional groups, examples being hydroxyl groups or carbonyl groups, and also reactive functional groups complementary to them, examples being methylol groups or hydrazide groups, are present and are able to crosslink with one another.

Examples of suitable complementary reactive functional groups and autoreactive functional groups are known from German patent application DE 199 30 665 A1, page 7, line 28 to page 9, line 24.

In the curing of such coating materials, there will of course always be a proportional physical curing, this being the formation of a film by loss of solvent from polymer solutions or polymer dispersions and interlooping of the polymers. In that case, nevertheless, the coating material is referred to as thermally curing.

Preferably, moreover, there is a thickener in the basecoat material of the invention. Suitable thickeners are inorganic thickeners from the group of the phyllosilicates. Besides the inorganic thickeners, however, there may also be one or more organic thickeners used. These are preferably selected from the group consisting of (meth)acrylic acid-(meth) acrylate copolymer thickeners, such as the commercial product Rheovis AS 1130 (BASF), for example, and polyurethane thickeners, such as the commercial product Rheovis PU 1250 (BASF), for example. The thickeners used are different from the binders used.

The sum of the weight percentage fractions, based on the total weight of the pigmented aqueous basecoat material, of all thickeners is preferably from 0.1 to 2.5 wt %, more preferably 0.15 to 2.0 wt %, and very preferably 0.2 to 2.0 wt %.

The pigmented aqueous basecoat material may further comprise at least one additive. Examples of such additives are salts which can be decomposed thermally without residue or substantially without residue, binder resins different from the above-described polymers and curable physically, thermally and/or with actinic radiation, examples being the polymers described in WO 2016/091539 A1, page 9, line 30 to page 33, line 2, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, radical polymerization initiators, adhesion promoters, flow control agents, film-forming assistants, sag control agents (SCAs), flame retardants, corrosion inhibitors, waxes, siccatives, biocides, and matting agents.

Suitable additives of the aforementioned kind are known for example from

German patent application DE 199 48 004 A1, page 14, line 4 to page 17, line 5,
German patent DE 100 43 405 C1, column 5, paragraphs [0031] to [0033].

They are used in the customary and known amounts.

The solids content of the basecoat materials of the invention may vary according to the requirements of the case in hand. The solids content is guided primarily by the viscosity required for application, more particularly for spray application, and so may be adjusted by the skilled person on the basis of his or her general art knowledge, optionally with assistance from a few exploratory tests.

The solids content of the basecoat materials is preferably 5 to 70 wt %, more preferably 8 to 60 wt %, and very preferably 12 to 55 wt %.

By solids content (nonvolatile fraction) is meant that weight fraction which remains as a residue on evaporation under specified conditions. In the present application, the solids content, unless explicitly indicated otherwise, is determined in accordance with DIN EN ISO 3251. This is done by evaporating the basecoat material at 130° C. for 60 minutes.

Unless indicated otherwise, this test method is likewise employed in order to determine, for example, the fraction of various components of the basecoat material as a proportion of the total weight of the basecoat material. Thus, for example, the solids content of a dispersion of a polyurethane resin which is to be added to the basecoat material may be determined correspondingly in order to ascertain the fraction of this polyurethane resin as a proportion of the overall composition.

The basecoat material of the invention is aqueous. The expression "aqueous" is known in this context to the skilled person. The phrase refers in principle to a basecoat material which is not based exclusively on organic solvents, i.e., does not contain exclusively organic-based solvents as its solvents but instead, in contrast, includes a significant fraction of water as solvent. "Aqueous" for the purposes of the present invention should preferably be understood to mean that the coating composition in question, more particularly the basecoat material, has a water fraction of at least 40 wt %, preferably at least 50 wt %, very preferably at least 60 wt %, based in each case on the total amount of the solvents present (i.e., water and organic solvents). Preferably in turn, the water fraction is 40 to 90 wt %, more particularly 50 to 80 wt %, very preferably 60 to 75 wt %, based in each case on the total amount of the solvents present.

The basecoat materials employed in accordance with the invention may be produced using the mixing assemblies and mixing techniques that are customary and known for producing basecoat materials.

In one preferred embodiment
the sum of the weight percentage fractions, based on the film-forming solids content of the pigmented aqueous basecoat material, of all hydroxyl-functional polymers (A) as binder component is 2 to 95 wt %,
the sum of the weight percentage fractions, based on the film-forming solids content of the pigmented aqueous basecoat material, of all binder components (B) is 2 to 95 wt %, and
the sum of the weight percentage fractions, based on the total weight of the pigmented aqueous basecoat material, of all monoalcohols (C) is 1 to 10 wt %.

A further aspect of the present invention is a method for producing a multicoat paint system, by
(1) applying a pigmented aqueous basecoat material to a substrate,
(2) forming a polymer film from the coating material applied in stage (1),
(3) applying a clearcoat material to the resultant basecoat film, and then
(4) curing the basecoat film together with the clearcoat film, which comprises using in stage (1) an aqueous basecoat material of the invention and passing the basecoat material via a circulation line system during the method.

All of the above observations relating to the aqueous basecoat material of the invention are also valid in respect of the method of the invention. This is true more particularly also of all preferred, very preferred, and especially preferred features.

Said method is preferably used to produce multicoat color paint systems, effect paint systems, and color and effect paint systems.

The pigmented aqueous basecoat material used in accordance with the invention is commonly applied to metallic or plastics substrates that have been pretreated with surfacer or primer-surfacer. Said basecoat material may optionally also be applied directly to the plastics substrate.

Where a metallic substrate is to be coated, it is preferably further coated with an electrocoat system before the surfacer or primer-surfacer is applied.

Where a plastics substrate is being coated, it is preferably also pretreated before the surfacer or primer-surfacer is applied. The techniques most frequently employed for such pretreatment are those of flaming, plasma treatment, and corona discharge. Flaming is used with preference.

Application of the pigmented aqueous basecoat material of the invention to metallic substrates already coated, as described above, with cured electrocoat systems and/or surfacers may take place in the film thicknesses customary within the automobile industry, in the range, for example, of 5 to 100 micrometers, preferably 5 to 60 micrometers. This is done using spray application methods, as for example compressed air spraying, airless spraying, high-speed rotation, electrostatic spray application (ESTA), alone or in conjunction with hot spray application, such as, for example, hot air spraying.

Following the application of the pigmented aqueous basecoat material, it can be dried by known methods. For example, (1-component) basecoat materials, which are preferred, can be flashed at room temperature for 1 to 60 minutes and subsequently dried, preferably at optionally slightly elevated temperatures of 30 to 90° C. Flashing and drying in the context of the present invention mean the evaporation of organic solvents and/or water, as a result of which the paint becomes drier but is not yet cured or as yet no fully crosslinked coating film is formed.

Then a commercial clearcoat material is applied, by likewise common methods, the film thicknesses again being within the customary ranges—for example, 5 to 100 micrometers.

After the clearcoat material has been applied, it can be flashed at room temperature for 1 to 60 minutes, for example, and optionally dried. The clearcoat material is then cured together with the applied pigmented basecoat material. In the course of these procedures, crosslinking reactions occur, for example, to produce on a substrate a multicoat color and/or effect paint system of the invention. Curing takes place preferably thermally at temperatures from 60 to 200° C.

In one particular embodiment, the method for producing a multicoat paint system comprises the following steps:
producing a cured electrocoat film on the metallic substrate by electrophoretic application of an electrocoat material to the substrate and subsequent curing of the electrocoat material,
producing (i) a basecoat film or (ii) a plurality of basecoat films directly following one another directly on the cured electrocoat film by (i) application of an aqueous basecoat material directly to the electrocoat film, or (ii) directly successive application of a plurality of basecoat materials to the electrocoat film,
producing a clearcoat film directly on (i) the basecoat film or (ii) the uppermost basecoat film, by application of a clearcoat material directly to (i) the one basecoat film or (ii) the uppermost basecoat film,
where (i) the one basecoat material or (ii) at least one of the basecoat materials is a basecoat material of the invention, jointly curing the basecoat film (i) or the basecoat films (ii) and also the clearcoat film.

In the latter embodiment, then, in comparison to the above-described standard methods, there is no application and separate curing of a commonplace surfacer. Instead, all of the films applied to the electrocoat film are cured jointly, thereby making the overall operation much more economical.

The application of a coating material directly to a substrate or directly to a previously produced coating film is understood as follows: The respective coating material is applied in such a way that the coating film produced from it is disposed on the substrate (on the other coating film) and is in direct contact with the substrate (with the other coating film). Between coating film and substrate (other coating film), therefore, there is more particularly no other coat. Without the detail "direct", the applied coating film, while disposed on the substrate (the other film), need not necessarily be present in direct contact. More particularly, further coats may be disposed between them. In the context of the present invention, therefore, the following is the case: In the absence of particularization as to "direct", there is evidently no restriction to "direct".

Plastics substrates are coated basically in the same way as metallic substrates. Here, however, in general, curing takes place at significantly lower temperatures, of 30 to 90° C. Preference is therefore given to the use of two-component clearcoat materials.

The method of the invention can be used to paint metallic and nonmetallic substrates, more particularly plastics substrates, preferably automobile bodies or components thereof.

The method of the invention can be used further for dual finishing in OEM finishing. This means that a substrate which has been coated by means of the method of the invention is painted for a second time, likewise by means of the method of the invention.

The invention relates further to multicoat paint systems which are producible by the method described above. These multicoat paint systems are to be referred to below as multicoat paint systems of the invention.

All of the above observations relating to the aqueous basecoat material of the invention are correspondingly also valid in respect of said multicoat paint system and of the method of the invention. This is also true especially of all the preferred, more preferred and most preferred features.

These multicoat paint systems are produced preferably on automobile bodies or components thereof, by means of the above-designated method of the invention, as part of automotive OEM finishing.

A further aspect of the present invention is the use of a combination of the above-denoted components (A), (B), and (C) in aqueous basecoat materials for enhancing the circulation line stability of these basecoat materials.

The invention is elucidated below with reference to examples.

EXAMPLES

Production of Aqueous Basecoat Materials

Production of Aqueous Basecoat Materials

With regard to the formulation constituents and amounts thereof that are indicated in the tables below, the following should be borne in mind: Where reference is made to a commercial product or to a preparation protocol described elsewhere, the reference is specifically to that commercial product or specifically to the product prepared in the case of the referenced protocol, irrespective of the principal designation selected for the constituent in each case.

If, therefore, a formulation constituent possesses the principal designation "melamine-formaldehyde resin" and if a commercial product is specified for it, then the melamine-formaldehyde resin is used in the form of exactly that commercial product. Any further constituents present in the commercial product, such as solvents, must therefore be taken into account if conclusions are to be drawn about the amount of the active substance (the melamine-formaldehyde resin). If a preparation protocol is referenced for a formulation constituent and if this preparation results, for solids content, then exactly that dispersion is used. It is immaterial whether the principal designation selected is that of "polymer dispersion" or only of the active substance, such as "polymer", "polyester" or "polyurethane-modified polyacrylate", for example. This must be taken into account if conclusions are to be drawn about the amount of the active substance (the polymer).

Production of a Silver Comparative Waterborne Basecoat Material 1 (C1)

The components listed in table A under "Aqueous phase" were combined with stirring in the order stated to form an aqueous mixture. In the next step, an organic mixture was produced from the components listed under "Organic phase". The organic mixture was added to the aqueous mixture. The resulting mixture was then stirred for 10 minutes and adjusted using deionized water and dimethylethanolamine to a pH of 8 and to a spray viscosity of 80±mPas under a shearing load of 1000 $s^{-1}$ as measured with a rotary viscometer (Rheomat RM 180 instrument from Mettler-Toledo) at 23° C.

TABLE A

| Component | Parts by weight |
|---|---|
| Aqueous phase | |
| 3% Na Mg phyllosilicate solution | 12 |
| Deionized water | 32.4 |
| Butyl glycol | 5.0 |
| Isopar L (from ExxonMobil) | 0.9 |
| Polyurethane-modified polyacrylate (A); prepared as per page 7 line 55 to page 8 line 23 of DE 44 37 535 A | 3.0 |
| 50 wt % solution of Rheovis PU 1250 (BASF), rheological agent | 1.9 |
| 10 wt % solution of Rheovis AS 1130 (BASF), rheological agent | 3.0 |
| Hydroxyl-functional polyester (A), prepared as per example D, column 16, lines 37-59 of DE 400 98 58 A1 | 2.0 |
| TMDD 50% BG (BASF), 52% solution of 2,4,7,9-tetramethyl-5-decyne-4,7-diol in butyl glycol | 1.0 |
| Melamine-formaldehyde resin (Luwipal 052, BASF) | 6.4 |
| 10% dimethylethanolamine in water | 0.5 |
| Binder component (B) (Daotan VTW 6462 (from Allnex)) | 12.7 |
| Pluriol P 900 (BASF) | 2.4 |
| Carbon black paste | 0.4 |
| Yellow paste | 0.4 |
| Red paste | 3.5 |
| Organic phase | |
| Mixture of two commercial aluminum pigments, available from Altana-Eckart | 5.2 |
| Butyl glycol | 5.2 |
| Hydroxyl-functional polyester (A), prepared as per example D, column 16, lines 37-59 of DE 400 98 58 A1 | 5 |

Production of the Carbon Black Paste:

The carbon black paste was produced from 58.9 parts by weight of a polyurethane dispersion prepared as per international patent application WO 92/15405 (polymer (A)), 10 parts by weight of carbon black, 5 parts by weight of a hydroxyl-functional polyester prepared as per example D, column 16, lines 37-59 of DE 400 98 58 A1 (polymer (A)), 7.6 parts by weight of butyl diglycol (BASF SE), 8.2 parts by weight of dimethylethanolamine (10% in DI water), 2.2 parts by weight of a commercial polyether (Pluriol® P900 from BASF SE), and 8.1 parts by weight of deionized water.

Production of the Yellow Paste:

The yellow paste was produced from 43.6 parts by weight of a polyurethane dispersion prepared as per international patent application WO 92/15405 (polymer (A)), 17.3 parts by weight of a commercial yellow pigment (Sicotrans® Yellow; BASF SE), 18.3 parts by weight of a hydroxyl-functional polyester prepared as per example D, column 16, lines 37-59 of DE 400 98 58 A1 (polymer (A)), 4.3 parts by weight of butyl diglycol (BASF SE), and 16.5 parts by weight of deionized water.

Production of the Red Paste:

The red paste was produced from 49.7 parts by weight of an acrylated polyurethane dispersion prepared as per international patent application WO 91/15528, binder dispersion A (polymer (A)), 12 parts by weight of Sicotrans® Red (BASF SE), 3 parts by weight of a commercial polyether (Pluriol® P900 from BASF SE), 2 parts by weight of butyl glycol (BASF SE), 1 part by weight of dimethylethanolamine (10% in DI water), and 32.3 parts by weight of deionized water.

Production of an Inventive Waterborne Basecoat Material I1

Waterborne basecoat material I1 was produced as per table A, but replacing the 5 parts by weight of butyl glycol (BASF SE) in the aqueous phase by 5 parts by weight of 3-butoxy-2-propanol (BASF SE) (monoalcohol (C)).

Production of an Inventive Waterborne Basecoat Material I2

Waterborne basecoat material I2 was produced as per table A, but replacing the 5 parts by weight of butyl glycol (BASF SE) in the aqueous phase by 5 parts by weight of 2-ethylhexanol (BASF SE) (monoalcohol (C)).

Production of an Inventive Waterborne Basecoat Material I3

Waterborne basecoat material I3 was produced as per table A, but replacing the 5 parts by weight of butyl glycol (BASF SE) in the aqueous phase by 5 parts by weight of 1-propoxy-2-propanol (BASF SE) (monoalcohol (C)).

Production of an Inventive Waterborne Basecoat Material I4

Waterborne basecoat material I4 was produced as per table A, but replacing the 5 parts by weight of butyl glycol (BASF SE) in the aqueous phase by 5 parts by weight of dipropylene glycol monomethyl ether (BASF SE) (monoalcohol (C)).

Production of an Inventive Waterborne Basecoat Material I5

Waterborne basecoat material I5 was produced as per table A, but replacing the 5 parts by weight of butyl glycol (BASF SE) in the aqueous phase by 5 parts by weight of 2-ethylhexyl glycol (Eastman Chemical) (monoalcohol (C)).

Production of a Comparative Waterborne Basecoat Material 2 (C2)

Waterborne basecoat material C2 was produced as per table A, but replacing the 5 parts by weight of butyl glycol (BASF SE) in the aqueous phase by 5 parts by weight of isopropanol (BASF SE).

Production of a Comparative Waterborne Basecoat Material 3 (C3)

Waterborne basecoat material C3 was produced as per table A, but replacing the 5 parts by weight of butyl glycol (BASF SE) in the aqueous phase by 5 parts by weight of N-ethylpyrrolidone (BASF SE).

Production of a Comparative Waterborne Basecoat Material 4 (C4)

Waterborne basecoat material C4 was produced as per table A, but replacing the 5 parts by weight of butyl glycol (BASF SE) in the aqueous phase by 5 parts by weight of n-butanol (BASF SE).

Table B summarizes once again all of the basecoat materials produced.

TABLE B

| | Solvent |
|---|---|
| Waterborne basecoat material C1 | butyl glycol |
| Waterborne basecoat material C2 | isopropanol |
| Waterborne basecoat material C3 | N-ethylpyrrolidone |
| Waterborne basecoat material C4 | n-butanol |
| Waterborne basecoat material I1 | 3-butoxy-2-propanol |
| Waterborne basecoat material I2 | 2-ethylhexanol |
| Waterborne basecoat material I3 | 1-propoxy-2-propanol |
| Waterborne basecoat material I4 | dipropylene glycol monomethyl ether |
| Waterborne basecoat material I5 | 2-ethylhexyl glycol |

Comparative Investigation of the Basecoat Materials for their Circulation Line Stability For determining the shade stability of the relevant coating materials in respect of circulation line exposure, 20 liters of each of the coating materials were treated as follows:

The coating material was introduced into a circulation line system. The coating materials were then pumped in circulation for a period of 77.1 minutes at a system operating pressure of 10 bar and at a temperature of 21±2° C. After this time, corresponding to an exposure of turnovers (1 turnover (TO)=1 circulation of material in the circulation line), 1.5 liters of the coating material were removed for coating purposes. This procedure was repeated up to a coating-material exposure of 2000 TO, with the times in the circulation line system being adapted as per table C because of the reducing volume of material with each sampling.

TABLE C

Sampling and corresponding turnover versus residence times in the circulation line system

| Sample No. | TO | Remaining volume before sampling [l] | Time difference (sample X – sample (X + 1)) [min] | Sample volume [l] |
|---|---|---|---|---|
| 0 | 0 | 20 | 0 | 1.5 |
| 1 | 50 | 18.5 | 77.1 | 1.5 |
| 2 | 250 | 17.0 | 283.3 | 1.5 |
| 3 | 500 | 15.5 | 322.9 | 1.5 |
| 4 | 1000 | 14.0 | 583.3 | 1.5 |
| 5 | 1250 | 12.5 | 302.1 | 1.5 |
| 6 | 1500 | 11.0 | 229.2 | 1.5 |
| 7 | 1750 | 9.5 | 197.9 | 1.5 |
| 8 | 2000 | 8.0 | 166.7 | 1.5 |

The coating material samples obtained were subsequently coated according to a standard procedure, and the resulting shades were subjected to measurement.

Coating:

The substrate used was a metal panel with dimensions of 10 cm×20 cm, which had a cured primer-surfacer system produced from a commercial primer-surfacer in a film thickness of 30±3 µm. Atop this substrate first of all in each case, the waterborne basecoat material (the coating material sample) was applied pneumatically with a dry film thickness of 13 to 18 µm. After 1 minute of flashing-off at room temperature, the waterborne basecoat material was subjected to interim drying in a forced air oven at 70° C. for 10 minutes. Thereafter the two-component clearcoat material ProGloss® (FF99-0345), available commercially from BASF Coatings GmbH, was applied, again pneumatically, with a dry film thickness of 40±5 µm and, after 20 minutes of flashing-off at room temperature, basecoat and clearcoat were jointly baked in a forced air oven at 140° C. for 20 minutes.

Shade Measurement:

Shade measurement was carried out using the MA68II spectrophotometer from X-Rite.

Table 1 shows the lightness values of the shade measurements on the various samples relative to the exposures in the circulation line. Reported here in each case is the difference value relative to the measurement of the coating system with the unexposed basecoat material.

TABLE 1

| | Sample | TO | L (25°) | L (45°) | L (75°) |
|---|---|---|---|---|---|
| Waterborne basecoat material 1 | 0 | 0 | 0 | 0 | 0 |
| | 1 | 50 | −0.13 | −0.03 | 0.01 |
| | 2 | 250 | −0.24 | 0.75 | 0.61 |
| | 3 | 500 | −1.00 | 0.89 | 0.95 |
| | 4 | 1000 | −0.98 | 1.74 | 1.65 |
| | 5 | 1250 | −1.36 | 2.20 | 2.06 |
| | 6 | 1500 | −1.53 | 2.10 | 2.13 |
| | 7 | 1750 | −1.68 | 2.61 | 2.55 |
| | 8 | 2000 | −2.07 | 2.76 | 2.74 |
| Waterborne basecoat material 2 | 0 | 0 | 0 | 0 | 0 |
| | 1 | 50 | −0.07 | 0.29 | 0.35 |
| | 2 | 250 | −0.05 | 1.09 | 0.88 |
| | 3 | 500 | −0.57 | 1.47 | 1.46 |
| | 4 | 1000 | −1.12 | 2.14 | 2.10 |
| | 5 | 1250 | −1.16 | 2.98 | 2.85 |
| | 6 | 1500 | −1.63 | 3.22 | 3.08 |
| | 7 | 1750 | −1.75 | 3.00 | 3.03 |
| | 8 | 2000 | −2.13 | 2.97 | 3.12 |
| Waterborne basecoat material 3 | 0 | 0 | 0 | 0 | 0 |
| | 1 | 50 | −0.35 | 0.60 | 0.52 |
| | 2 | 250 | −0.59 | 1.15 | 1.05 |
| | 3 | 500 | −0.77 | 1.86 | 1.60 |
| | 4 | 1000 | −1.20 | 2.85 | 2.45 |
| | 5 | 1250 | −1.09 | 2.89 | 2.61 |
| | 6 | 1500 | −1.42 | 2.80 | 2.71 |
| | 7 | 1750 | −1.38 | 3.31 | 3.04 |
| | 8 | 2000 | −1.92 | 3.50 | 3.39 |
| Waterborne basecoat material 4 | 0 | 0 | 0 | 0 | 0 |
| | 1 | 50 | −0.11 | 0.34 | 0.39 |
| | 2 | 250 | −0.17 | 1.02 | 0.96 |
| | 3 | 500 | −0.63 | 1.48 | 1.52 |
| | 4 | 1000 | −1.19 | 2.08 | 2.21 |
| | 5 | 1250 | −1.27 | 2.89 | 2.93 |
| | 6 | 1500 | −1.59 | 3.08 | 3.01 |
| | 7 | 1750 | −1.79 | 3.14 | 3.21 |
| | 8 | 2000 | −2.25 | 3.28 | 3.31 |
| Waterborne basecoat material I1 | 0 | 0 | 0 | 0 | 0 |
| | 1 | 50 | −0.16 | 0.04 | 0.12 |
| | 2 | 250 | −0.01 | 0.25 | 0.34 |
| | 3 | 500 | −0.30 | 0.26 | 0.40 |
| | 4 | 1000 | −0.16 | 0.90 | 0.81 |
| | 5 | 1250 | −0.16 | 1.00 | 0.98 |
| | 6 | 1500 | −0.46 | 1.30 | 1.15 |
| | 7 | 1750 | −0.57 | 1.48 | 1.27 |
| | 8 | 2000 | −0.59 | 1.37 | 1.32 |
| Waterborne basecoat material I2 | 0 | 0 | 0 | 0 | 0 |
| | 1 | 50 | 1.31 | −0.63 | −0.74 |
| | 2 | 250 | 1.34 | −0.81 | −0.55 |
| | 3 | 500 | 1.41 | −0.81 | −0.52 |
| | 4 | 1000 | 1.10 | −0.84 | −0.46 |
| | 5 | 1250 | 1.13 | −0.60 | −0.14 |
| | 6 | 1500 | 0.65 | −0.94 | −0.16 |
| | 7 | 1750 | 1.35 | −0.79 | −0.51 |
| | 8 | 2000 | 1.39 | −0.81 | −0.58 |
| Waterborne basecoat material I3 | 0 | 0 | 0 | 0 | 0 |
| | 1 | 50 | −0.27 | 0.08 | 0.17 |
| | 2 | 250 | −0.18 | 0.32 | 0.24 |

TABLE 1-continued

|  | Sample | TO | L (25°) | L (45°) | L (75°) |
|---|---|---|---|---|---|
|  | 3 | 500 | −0.24 | 0.39 | 0.45 |
|  | 4 | 1000 | −0.21 | 0.95 | 0.91 |
|  | 5 | 1250 | −0.29 | 1.10 | 1.23 |
|  | 6 | 1500 | −0.62 | 1.46 | 1.39 |
|  | 7 | 1750 | −0.71 | 1.58 | 1.61 |
|  | 8 | 2000 | −0.75 | 1.42 | 1.38 |
| Waterborne basecoat material I4 | 0 | 0 | 0 | 0 | 0 |
|  | 1 | 50 | 1.21 | −0.91 | −0.87 |
|  | 2 | 250 | 1.14 | −0.87 | −1.04 |
|  | 3 | 500 | 1.29 | −1.06 | −0.75 |
|  | 4 | 1000 | 1.38 | −1.15 | −0.93 |
|  | 5 | 1250 | 1.45 | −1.25 | −1.01 |
|  | 6 | 1500 | 1.35 | −1.09 | −0.83 |
|  | 7 | 1750 | 1.30 | −1.03 | −0.79 |
|  | 8 | 2000 | 1.41 | −1.39 | −1.21 |
| Waterborne basecoat material I5 | 0 | 0 | 0 | 0 | 0 |
|  | 1 | 50 | 0.89 | −0.67 | −0.95 |
|  | 2 | 250 | 0.91 | −0.78 | −1.14 |
|  | 3 | 500 | 1.21 | −0.95 | −1.28 |
|  | 4 | 1000 | 1.39 | −0.71 | −1.01 |
|  | 5 | 1250 | 1.25 | −1.24 | −1.05 |
|  | 6 | 1500 | 1.17 | −1.09 | −1.36 |
|  | 7 | 1750 | 1.38 | −1.28 | −1.11 |
|  | 8 | 2000 | 1.31 | −1.32 | −1.13 |

The results emphasize the much greater circulation line resistance of the basecoat materials of the invention. Thus the shade (represented here by the lightness values) of the resulting paint systems remains much more stable under increasing circulation line exposure, by comparison with paint systems produced using the comparative waterborne basecoat materials C1 to C4.

What is claimed is:

1. An aqueous basecoat material comprising
   (A) at least one hydroxyl-functional polymer as a binder component,
   (B) at least one binder component which is different from component (A) and comprises
      (B1) at least one carbonyl group-containing polyurethane poly(meth)acrylate and also
      (B2) at least one organic compound having at least two hydrazine, hydrazide and/or hydrazone groups,
   and also
   (C) at least one branched and/or secondary aliphatic monoalcohol having at least four carbon atoms.

2. The basecoat material as claimed in claim 1, wherein the at least one polymer of the binder component (A) has a hydroxyl number of 5 to 200 mg KOH/g.

3. The basecoat material as claimed in claim 1, wherein the binder component (A) comprises at least one hydroxyl-functional polyester.

4. The basecoat material as claimed in claim 3, wherein the binder component (A) further comprises at least one hydroxyl-functional polyurethane.

5. The basecoat material as claimed in claim 1, wherein component (B2) used comprises at least one bishydrazide of a dicarboxylic acid having 2 to 12 C atoms.

6. The basecoat material as claimed in claim 1, wherein the polymers of the binder component (A) and the polymer (B1) of the binder component (B) are prepared in the form of an aqueous dispersion.

7. The basecoat material as claimed in claim 1, wherein the at least one monoalcohol (C) has at least 6 carbon atoms.

8. The basecoat material as claimed in claim 1, wherein the at least one monoalcohol has 6 to 12 carbon atoms.

9. The basecoat material as claimed in claim 1, wherein the at least one monoalcohol is selected from the group consisting of 3-butoxy-2-propanol, 1-propoxy-2-propanol, dipropylene glycol monomethyl ether, 2-ethylhexanol, and 2-ethylhexyl glycol.

10. The basecoat material as claimed in claim 1, wherein the at least one monoalcohol is selected from the group consisting of 3-butoxy-2-propanol and 2-ethylhexanol.

11. A method for producing a multicoat paint system, by
   (1) applying a pigmented aqueous basecoat material to a substrate,
   (2) forming a polymer film from the coating material applied in stage (1),
   (3) applying a clearcoat material to the resulting basecoat film, and subsequently
   (4) curing the basecoat film together with the clearcoat film,
which comprises using in stage (1) an aqueous basecoat material as claimed in claim 1 and passing the basecoat material via a circulation line system during the method.

12. A multicoat paint system producible by the method as claimed in claim 11.

13. A method for improving the circulation line stability of basecoat materials, the method comprising the use of a combination of
   (A) at least one hydroxyl-functional polymer as a binder component,
   (B) at least one binder component which is different from component (A) and comprises
      (B1) at least one carbonyl group-containing polyurethane poly(meth)acrylate and also
      (B2) at least one organic compound having at least two hydrazine, hydrazide and/or hydrazone groups,
   and also
   (C) at least one branched and/or secondary aliphatic monoalcohol having at least four carbon atoms.

14. The basecoat material as claimed in claim 7, wherein the at least one monoalcohol (C) has at least 7 carbon atoms.

15. The basecoat material as claimed in claim 8, wherein the at least one monoalcohol has 7 or 8 carbon atoms.

* * * * *